United States Patent [19]

Owen

[11] Patent Number: 4,653,431

[45] Date of Patent: Mar. 31, 1987

[54] DEVICE TO FEED A SINGLE ANIMAL

[75] Inventor: Fred T. Owen, Clifton, Tex.

[73] Assignee: Willis B. Pierce, Dallas, Tex.

[21] Appl. No.: 764,408

[22] Filed: Aug. 12, 1985

[51] Int. Cl.⁴ .............................................. A01K 5/01
[52] U.S. Cl. ..................................................... 119/61
[58] Field of Search ............... 119/63, 61, 51 R, 52 R, 119/55

[56] References Cited

U.S. PATENT DOCUMENTS

| | | | |
|---|---|---|---|
| 624,795 | 5/1899 | Hammond | 119/27 |
| 2,751,883 | 6/1956 | Bacon | 119/51 R |
| 2,814,271 | 11/1957 | Black | 119/55 |

FOREIGN PATENT DOCUMENTS 696401  9/1951  United Kingdom .................. 119/61

Primary Examiner—Robert P. Swiatek
Attorney, Agent, or Firm—Crutsinger & Booth

[57] ABSTRACT

A light weight portable device to feed a single animal in a pasture with a herd of similar animals. The device has a base supporting a substantial portion of the weight of an animal to anchor and stabilize the structure and a feed container. A fence extends upwardly from the base and has a narrow entrance opening for permitting access of the single animal to the feed container while preventing intrusion to the container by other animals in the herd.

10 Claims, 3 Drawing Figures

DEVICE TO FEED A SINGLE ANIMAL

BACKGROUND AND BRIEF SUMMARY OF THE INVENTION

It is well known in cattle breeding that to develop an outstanding herd, it is necessary to have an outstanding herd sire or bull as well as outstanding cows. Normally, three bulls or herd sires must be used per hundred head of cows when the herd is being developed by natural pasture breeding. Although a single bull may be used per one hundred cows when fed a proper dietary supplement, as a practical matter, however, nobody has been able to accomplish this desireable result prior to the present invention. The problem has been that the other cattle in the pasture will attempt to eat the dietary supplement when taken into the pasture in a container. This forces the bull away from the container and prevents his receiving the supplemented diet. If the bull is removed from the herd and moved to a separate area for feeding the supplement, then the bull is unable to service the cows while removed from the pasture. The present invention, however, permits a single herd sire or bull in a herd of similar animals to be fed without any disturbance by the other animals, which permits a herd sire or bull to service a hundred cows and thereby increase the productivity of such a single herd sire.

Accordingly, it is an object of the present invention to provide a feeding device to feed a single animal in a herd of similar animals so as to increase the productivity of such single animal.

Further, it is an object of the present invention to provide a device to feed a single animal in a herd of similar animals to permit enhanced herd characteristics by the use of the single superior herd sire.

Further, it is an object of the present invention to provide a light weight portable device to feed a single animal in a herd of similar animals that enables the single animal to feed without interference from the similar animals.

In accordance with the present invention, a device to feed a single animal in a pasture containing a herd of similar animals, comprises a container for supporting a quantity of feed supported by a base. Fence apparatus extends upwardly from the base for permitting access of the single animal to the container while preventing intrusion to the container by the similar animals.

Further, in accordance with the present invention, a portable device to feed a single animal in a pasture containing a herd of similar animals, comprises a container for supporting a quantity of feed to be fed the single animal. A base supports the container and is positioned to receive and support part of the weight of the animal which permits the use of a light weight portable structure which is stabilized by the animal that is being fed. Fence apparatus extends upwardly from the base to the shoulder of the animal to permit access of the single animal to the container while preventing intrusion by the similar animals to the container. The fence structure and base are made sufficiently light to permit movement by a single individual to a location where the animals are located and is anchored in position by the animal that is feeding.

Other and further objects and advantages of the invention will become apparent upon reading the following detailed description and upon reference to the drawings.

BRIEF DESCRIPTION OF THE DRAWINGS

Drawing of a preferred embodiment of the invention are attached in which.

Like reference characters designate like parts through out the drawing.

DETAILED DESCRIPTION OF A PREFERRED EMBODIMENT

Figure 1:
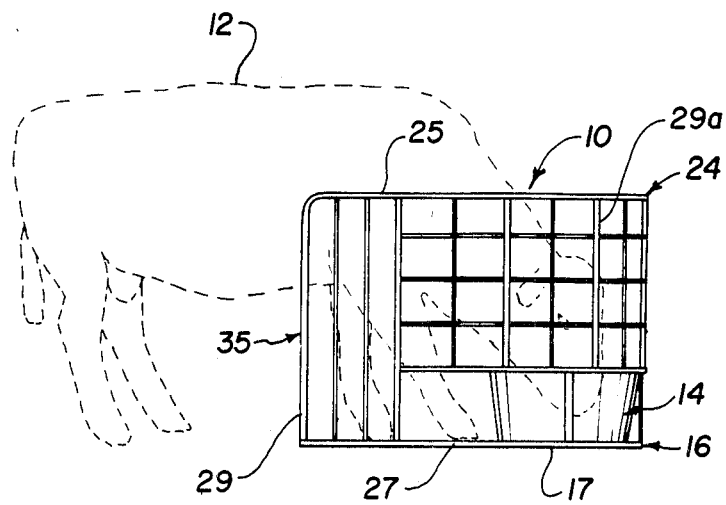
FIG. 1 is an elevational view of a device to feed a single animal in a herd of similar animals constructed according to the present invention.
Figure 2:
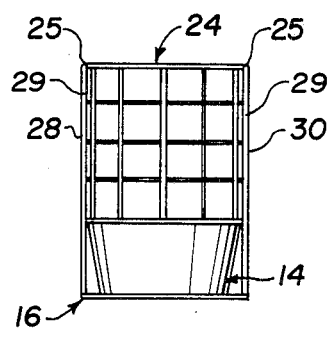
FIG. 2 is a rear elevational view of the invention shown in FIG. 1.
Figure 3:
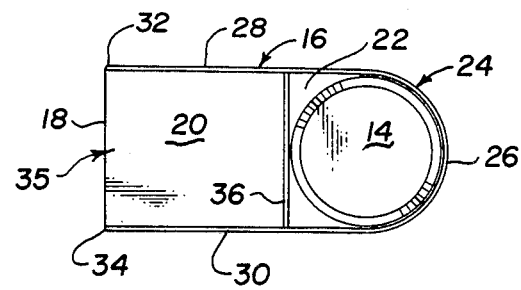
FIG. 3 is a plan view of the device shown in FIG. 1.

Turning to the drawings, there is shown in FIG. 1 an elevational view of an animal feeding device 10 constructed to feed a single animal 12 (shown in dotted outline) without interference by similar animals in a pasture containing a herd of animals. Device 10 is constructed to be sufficiently light so as to enable a single individual to transport the device into the pasture containing animal 12, preferably a bull, being herded with similar animals, such as breed cows.

Device 10 includes a feed container 14 for supporting a quantity of the dietary supplement to be fed to animal 12.

A base 16 supports container 14 and includes a floor 18 composed of animal support portion 20 and container support portion 22. Floor 18 has a length sufficient to allow single animal 12 to position its front feet thereon when feeding at container 14 which assists in stabilizing feeder 10 and thereby aid in preventing the other animals from turning device 10 over when the bull or other selected single animal 12 is eating.

Fence apparatus 24, for permitting access of single animal 12 to container 14 while preventing intrusion to container 14 by the other similar animals, is connected to and extends upwardly from base 16. Fence apparatus 24 includes a semi-circular enclosing portion 26, preferably having a radius of curvature matching a cylindrical radius of curvature of container 14, a first side portion 28 and a second side portion 30 extending from each end of blocking side 26 and are disposed to face one another. Side portion 28 and 30 are preferably tangent to the semi-cylindrical end enclosing portion 26 and have a length which is at least two times the diameter of portion 26. Fence apparatus 24 is preferably of lattice type construction so as to facilitate movement of the device by the single individual. The outer end 32 of first side 28 and the outer end 34 of second side 30 are displaced from one another by a distance sufficient to provide and entrance opening 35 and to permit access of single animal 12 to container 14 while preventing access of similar animals therebetween. Fence apparatus 24 is of sufficient height above base 16 to prevent access of similar animals to container 14.

Since beef cattle are bred to produce the largest amount of meat at the lowest cost, the most popular breeds have short legs, a solid compact body and a short thick neck. If fence 24 is at least one-half as tall as the animal, it is extremely difficult for the animal to reach over the fence to the vicinity of the ground on the opposite side of the fence. If fence 24 has a height in a range between one-half and three-fourths of the height of animals in the herd, the structure will protect feed in container 14 while minimizing weight.

The upper rails 25 of side portions 28 and 30 preferably connect to the rearmost posts 29 at a point in the vacinity of the front shoulder of an animal 12 being fed. When thus portioned, the base 18 receives a substantial portion of the weight of the animal to stabilize the device. Further, other animals cannot reach over the fence 24, while the weight of the structure is minimized. The container 14 and floor or base 16 may be made removable from a support frame to further reduce the weight and to facilitate handling of the portable stucture.

To reduce the weight of the structure, the lower rail 27 is spaced upwardly from base 16 adjacent container 14 since access to food in container 14 is blocked by side walls of the container. Posts 29a extend between top rail 25 and bottom rail 27 while lower ends of lower rails of posts 29 extend between upper rail 25 and a frame member 17 extending around the priphery of animal support portion or floor 20.

From the foregoing, it should be apparent that an animal 12 cannot eat from container 14 unless the front feet of the animal rest on base 20 because of the height of the fence 24 and the position of container 24.

A blocking bar 36 extends between first side 28 and second side 34 with a height above base 16 sufficient to prevent lateral movement of container 14 by single animal 12 and thereby assist in preventing spillage of the dietary supplement disposed within container 14.

In operation, the food supplement to be fed to bull 12 and device 10 are loaded by a single individual onto a vehicle for transportation to where the herd is being pastured. Near the herd sire, device 10 is unloaded and container 14 is mounted on base 16. A quantity of the food supplement is added to container 14. Herd sire 12 is then directed through the entrance opening between posts 29 at the ends of side portions 28 and 30 with the breeding cows being prevented from entry therebetween. Bull 12 is thus permitted to receive the dietary supplement without intrusion by the herd cows into container 14.

The invention having been described, what is claimed is:

1. A portable device to feed a single animal in a pasture containing a herd of similar animals, comprising: a container for supporting a quantity of feed; a base extending from said container and terminating rearwardly of the front legs of an animal eating from said container and forwardly of rear legs of the animal, said base being positioned to support a portion of the weight of an animal feeding from said container; and fence means extending upwardly from the base to a point in the vicinity of the front shoulders of the animal, said fence means having an entrance opening adjacent one side of the base for permitting access of the single animal to said container while preventing intrusion to said container by the similar animals and being arranged such that the animal cannot eat from said container unless the front feed of the animal rest on said base to stabilize said fence means, and said fence means being adapted to facilitate loading and unloading the portable feed device onto a vehicle by a single individual for transport to a site where a herd is pastured.

2. A device as set forth in claim 1, wherein said fence means includes a lattice side having an enclosing portion with said container disposed adjacent thereto, and first and second side portions extending from the ends of the enclosing portion and disposed to face each other, the first and second side portions having an outer end, the outer ends being displaced from one another by a distance sufficient to form an entrance opening to permit access of the single animal to said container and spaced to prevent access of more than one animal.

3. A device as set forth in claim 1, wherein said fence means includes an enclosing portion disposed along an end of said base adjacent said container, and first and second side portions extending from the ends of the enclosing portion and disposed to face one another along the length of said base, the first and second side portions having outer ends which are displaced from one another by a distance sufficient to permit access by the single animal to said container.

4. A device as set forth in claim 3, said fence means extending to a height above said base sufficient to prevent animals other than the single animal access over said fence means to said container.

5. A device as set forth in claim 3 wherein the enclosing portion of the fence means comprises a semi-cylindrical end portion entending upwardly from one end of the base and partially enclosing said container, said first and second side portions being substantially tangent to said semi-cylindrical portion.

6. A device as set forth in claim 5, said fence means extending to a height which is at least equal to one-half of the height of the animals in the herd.

7. A device as set forth in claim 6, said fence means extending upwardly from said base to a height which is in a range between one-half and three-forths of the height of animals in the herd.

8. A device as set forth in claim 7, said first and second side portions having a length which is at least two times the diameter of the semi-cylindrical portion.

9. A light weight portable device to feed a single animal in a pasture containing a herd of similar animals, comprising: a floor; a container on said floor for a quantity of feed, said floor being positioned to be engaged only by front feet of an animal to support a portion of the weight of an animal feeding from said container; and fence means extending upwardly from said floor, said fence means having a semi-cylindrical end portion extending upwardly from one end of the floor and partially enclosing said container; and first and second side portions being substantially tangent to said semi-cylindrical portion, said first and second side portions having a length which is at least two times the diameter of the semi-cylindrical portion, said fence means further having an entrance opening adjacent one side of the floor for permitting access of the single animal to said container and having a height in a range between one-half and three-fourths of the height of the animal to prevent intrusion to said container by the similar animals.

10. A device as set forth in claim 9, wherein said fence means includes a lattice side having an enclosing portion with said container disposed adjacent thereto, and first and second side portions extending from the ends of the enclosing portion and disposed to face each other, the first and second side portions having an outer end, the outer ends being displaced from one another by a distance sufficient to form an entrance opening to permit access of the single animal to said container and spaced to prevent access of more than one animal.

* * * * *